United States Patent [19]
Tsuzuki et al.

[11] Patent Number: 5,414,696
[45] Date of Patent: * May 9, 1995

[54] CELL EXCHANGING APPARATUS

[75] Inventors: Munenori Tsuzuki; Hideaki Yamanaka; Hirotaka Saito; Kazuyoshi Oshima, all of Kamakura, Japan

[73] Assignee: Mitsubishi Denki Kabushiki Kaisha, Tokyo, Japan

[*] Notice: The portion of the term of this patent subsequent to Mar. 14, 2012 has been disclaimed.

[21] Appl. No.: 975,104

[22] Filed: Nov. 12, 1992

[30] Foreign Application Priority Data

Nov. 15, 1991 [JP] Japan ........................ 3-300476
Feb. 24, 1992 [JP] Japan ........................ 4-036189

[51] Int. Cl.⁶ ............................................. H04J 3/14
[52] U.S. Cl. ................................. 370/16; 370/60; 370/94.1; 340/827; 371/8.1
[58] Field of Search ........................ 370/16, 60, 94.1; 340/827; 371/8.1

[56] References Cited

U.S. PATENT DOCUMENTS

| | | | |
|---|---|---|---|
| 4,603,416 | 7/1986 | Servel et al. | 370/60 |
| 4,692,894 | 9/1987 | Bemis | 364/900 |
| 4,730,305 | 3/1988 | Acampora et al. | 370/60 |
| 4,821,259 | 4/1989 | DeBruler et al. | 370/60 |
| 4,849,968 | 7/1989 | Turner | 370/94 |
| 4,851,991 | 7/1989 | Rubinfeld et al. | 364/200 |
| 4,920,534 | 4/1990 | Adelmann et al. | 370/94.1 |
| 4,935,922 | 6/1990 | Wicklund et al. | 370/60 |
| 4,949,301 | 8/1990 | Joshi et al. | 364/900 |
| 4,956,839 | 9/1990 | Torii et al. | 370/60 |
| 4,993,018 | 2/1991 | Hajikano et al. | 370/60 |
| 5,046,064 | 9/1991 | Suzuki et al. | 370/60 |
| 5,072,440 | 12/1991 | Isono et al. | 370/60 |
| 5,128,931 | 7/1992 | Yamanaka et al. | 370/60 |
| 5,222,085 | 6/1993 | Newman | 370/60 |

FOREIGN PATENT DOCUMENTS

| | | | |
|---|---|---|---|
| 0339735 | 11/1989 | European Pat. Off. | H04L 11/20 |
| 0455827 | 11/1990 | European Pat. Off. | H04L 12/48 |
| 0410139 | 1/1991 | European Pat. Off. | H04L 12/56 |
| 0455281 | 11/1991 | European Pat. Off. | H04L 12/56 |
| 0503663 | 9/1992 | European Pat. Off. | H04L 12/56 |
| 0300876 | 1/1989 | France | H04L 11/20 |
| WO86/02510 | 4/1986 | WIPO | H04L 11/20 |
| 62-230138 | 3/1988 | Japan | H04L 11/00 |
| 0279443 | 8/1988 | Japan | H04L 11/20 |
| 117241 | 10/1988 | Japan | H04L 11/20 |
| 0292962 | 11/1988 | Japan | H04L 11/20 |
| 0299473 | 1/1989 | Japan | H04L 11/20 |
| 0336373 | 10/1989 | Japan | H04L 11/20 |
| 1286645 | 11/1989 | Japan | H04L 1/22 |
| 2200038 | 8/1990 | Japan | H04L 12/42 |
| 2-228146 | 9/1990 | Japan | H04L 12/48 |
| 2-246646 | 10/1990 | Japan | H04L 12/48 |
| 3-26038 | 2/1991 | Japan | H04L 12/48 |
| WO88/07298 | 9/1988 | WIPO | H04L 11/20 |

OTHER PUBLICATIONS

"A hit-less protection switching method for ATM switch" T. Kurano Autumn meeting of The Institute of Electronics, Info & Communicat.

(List continued on next page.)

Primary Examiner—Douglas W. Olms
Assistant Examiner—Russell W. Blum
Attorney, Agent, or Firm—Wolf, Greenfield & Sacks

[57] ABSTRACT

An ATM cell exchanging apparatus includes an ATM cell switch for a first system #1 and an ATM cell switch for a second system. These cell switches distribute input cells to appropriate output lines. The system also includes selectors for switching the ATM cell switches in accordance with a selection signal that is output from an external system. The ATM switches output an idle cell when there is no cell to be output. When the selector judges that it is necessary to switch the systems as indicated by the change-over signal, the selector switches the system after it confirms that an idle cell is output from both ATM cell switches. The idle cell that is output indicates that there is no cell stored in either system; thus, it is easy to switch the systems without causing the duplication or omission of a cell.

18 Claims, 17 Drawing Sheets

OTHER PUBLICATIONS

"A study of a hit-less Protection Scheme for ATM Equipment" T. Koyanagi, 1991 Autumn meeting Institute of Electronics, etc.

"A Shared Buffer Memory Switch for an ATM Exchange", Kuwahara Proc. of IEEE.

J. Y. Hui et al., "A Broadband Packet Switch for Integrated Transport", IEEE Journal on Selected Areas in Communications, vol. SAC-3, No. 8, Oct. 1987, pp. 1264–1273.

Y. Sakurai et al., "Large Scale ATM Multi-Stage Switching Network with Shared Buffer Memory Switches".

Y. S. Yeh et al., "The Knockout Switch: A Simple, Modular Architecture for High-Performance Packet Switching".

J. -P. Coudreuse et al., "Prelude: An Asynchronous Time-Division Switch Network".

Y. Tamir et al., "High-Performance Multi-Queue Buffers For VLSI Communication Switches", The 15th Annual Int'l Symposium on Computer Architecture, May 30–Jun. 2, 1988, Honolulu, Hawaii.

K. Oshima et al., "A New ATM Switch Architecture Based on STS-Type Shared Buffering and its LSI Implementation", XIV Int'l Switching Symposium, Yokoham, Japan, Oct. 25–30, 1992.

Int'l Switching Symposium 1987, Mar., 1987, Phoenix, US; pp. 367–372; Dieudonne et al.; "Switching techniques for asynchronous time division multiplexing (or fast packet switching)", pp. 370–371, para. 6; FIGS. 5, 6.

TIME SLOT: 1 2 3 4 5 6 7 8 9

CELL EXCHANGING APPARATUS

BACKGROUND OF THE INVENTION

1. Field of the Invention

The present invention relates generally to asynchronous transfer mode (ATM) networks and, more particularly to a cell exchanging system for relaying cells and exchanging cells at a high speed.

2. Description of the Prior Art

A number of ATM techniques and architectures have been proposed to switch voice data, video data and other kinds of data. The ATM techniques are designed for use in a digital network such as an integrated services digital network (ISDN). ATM techniques improve the utilization efficiency of transmission in switching by statistical multiplexing of fixed length packets of the data, known as cells, on a broad band transmission line. The architectures for practicing ATM techniques include switching architectures for switching cells through the network.

FIG. 15 is a block diagram showing the change-over system of an ATM switch, which is described in Japanese Patent Laid-Open No. Hei 3-26038. The ATM switch is used to direct cells through the ATM network. As shown in FIG. 15, this ATM switch is provided with two ATM switch systems #1 and #2, which have the same structure. Redundant switch systems are provided to enhance the robustness of the network.

Identical ATM cells are input in parallel to the respective switch systems #1 and #2. These ATM cells are input in parallel to ATM switch buffers 30a and 30b of the ATM switch systems #1 and #2, and each cell is output to an external system after a delay. In order to monitor the number of cells which are stored in the ATM buffer switches 30a and 30b, ATM buffer cell counters 31a and 31b are provided. Each of the ATM buffer cell counters 31a and 31b increments its count value every time an ATM cell is input to the corresponding ATM switch buffer 30a and 30b, and decrements its count value every time an ATM cell is output from the Corresponding buffer. In this way, the ATM buffer cell counters 31a and 31b always monitor the number of cells that are stored in the respective ATM switch buffers 30a and 30b.

Systems #1 and #2 are provided with respective difference detectors 33a and 33b, for comparing the count values of the ATM buffer cell counters 31a and 31b. Systems #1 and #2 are also provided with respective dummy cell markers 32a and 32b for writing dummy cells into the ATM switch buffers 30a and 30b, in accordance with the control signals sent from the difference detectors 33a and 33b.

A plurality of ATM switches are disposed at intersections (cross points) of input and output paths so as to form a crossbar type ATM exchanging apparatus.

The operation of the conventional ATM switch systems of FIG. 15 will be explained below with reference to FIGS. 16A–16C, 17A and 17B. In FIGS. 16A–16C, 17A and 17B, switch system #1 (see FIG. 15) functions as the "currently used" system, whereas switch system #2 (see FIG. 15) functions as a "spare" system. In this illustrative case, each of the ATM switch buffers 30a and 30b stores the same cells "1"–"4", as shown in FIG. 16A. Accordingly, each of the ATM buffer cell counters 31a and 31b has a counter value of "4".

If ATM switch buffer 30b of switch system #2 ceases operating due to some problem, the contents of the ATM switch buffer 30b are lost, and the count value of the ATM buffer cell counter 31b is reset to "0", as shown in FIG. 16B. Even if the ATM switch of system #1 becomes operational again, a certain amount of time must elapse before switch system #2 may assume the "currently-used" role previously served by switch system #1.

When switch system #2 assumes the "currently-used" role, difference detector 33b (FIG. 15) detects the difference between the count values of the ATM buffer cell counters 31a and 31b. Difference detector 33b causes the dummy cell marker 32b to generate dummy cells (indicated by "0" entries) which are stored in the ATM switch buffer 30b until the difference in count values is eliminated. Dummy cells are, thus, stored until there is no difference between the count value of the ATM buffer cell counters 31a, 31b, and hence, the number of cells stored in the ATM switch buffer 30a equals the number of cells stored in the ATM switch buffer 30b.

For example, when cells "3"–"8" are stored in the ATM switch buffer 30a of switch system #1 and only the cell "8" is stored in the ATM switch buffer 30b of switch system #2, as shown in FIG. 16C, the difference in the number of cells stored in the respective switch buffers is "5". Hence, five dummy cells (indicated as "0") are generated and stored in the ATM switch buffer cell 30b. Both ATM buffer cell counters 31a and 31b then have a count value of "6".

In this state, switch system #2 begins to operate in the same way as switch system #1. FIG. 17A shows a subsequent state in which the leading four cells in buffers 30a and 30b have been output and in which four new cells have been supplied to the ATM switch buffers. FIG. 17B shows the state in which two additional cells (six cells in total) have been supplied to the ATM switch buffers 30a and 30b and the leading three cells have been removed from the buffers 30a and 30b. In the state shown in FIG. 17A, since the dummy cells remain, switch system #2 cannot function as a "spare" system. In other words, switch system #2 cannot be called upon to assume the role previously served by switch system #1. However, in the state shown in FIG. 17B, since no dummy cell remains, switch system #2 can be changed over to assume the role of system #1.

With the conventional cell exchanging system having the foregoing configuration, one control unit is shared by two switch systems so as to control which ATM switch of a plurality of ATM switches for outputting cells to the same output path should output a cell. In such a case, the status of cells stored in the switch buffers are the same for the two switch systems. There is however a problem that the control units cannot be doubled.

On the other hand, when each control unit is independently provided for the switch systems 1 and 2, respectively, there might be a case in which the switch buffers for the ATM switch systems 1 and 2 might store different numbers of cells. In such a case, the system 1 or 2 cannot be selected optionally.

It is, therefore, an object of the present invention to provide a cell exchanging apparatus which comprises two independent ATM switch systems and can perform change-over of the switches without duplication of cells and omission of the cells, and to provide a method therefor.

It is a further object of the present invention to provide a cell exchanging apparatus that does not repeat the transmission of cells or omit the transmission of cells during change-over.

SUMMARY OF THE INVENTION

The above and other objects, features and advantages of the present invention will become clear from the following description of the preferred embodiments thereof, taken in conjunction with the accompanying drawings.

In accordance with an embodiment of the present invention, an asynchronous transfer mode (ATM) cell exchanging apparatus distributes input cells to corresponding cell output lines. Each input cell includes a data portion and a header portion. The header portion includes address information that is used to direct the cell to its destination. The cell exchanging apparatus includes a first cell switch for distributing the input cells to a first set of switch output lines in accordance with the address information of the header portion of the input cells. The cell exchanging apparatus also includes a second redundant cell switch for distributing the input cells to a second set of switch output lines in accordance with the address information of the header portions of the input cells. Both the first cell switch and the second cell switch generate idle cells when there are no input cells.

The cell exchanging apparatus further includes a selection mechanism for selecting which of the first set of switch output lines and the second set of switch output lines is a currently selected switch of output lines that provides cells to the cell output lines. The selection mechanism is switchable between selecting the first set of switch output lines and the second set of switch output lines. The selection mechanism includes a confirmation mechanism for confirming that idle cells are output on each of the currently selected and spare set of switch output lines before switching selection by the selection mechanism of cells from the currently selected set of switch output lines to the other set of switch output lines.

The first cell switch and/or the second cell switch may be formed by a plurality of unit switches. In addition, the first and second cell switches may include arbitration logic for arbitrating competing requests to output a cell over a switch output line. In accordance with one embodiment, each of the unit switches is provided with an output buffer that temporarily stores the cells to the output. The unit switches request permission to output a cell when a cell is stored in its output buffer. In this embodiment, the arbitration circuit grants permission to one of the unit switches which are connected to a same switch output line and which are requesting permission to output a cell so that only the cell in the unit switch which is granted permission is output to the switch output line. The arbitration circuit instructs one of the unit switches to output an idle cell when no unit switch requests permission to output a cell.

BRIEF DESCRIPTION OF THE DRAWINGS

FIGS. 7A and 7B are diagrams showing the output timing for the embodiment shown in FIG. 2;

FIGS. 11A–11H are timing diagrams of signals of a buffer memory in the unit switch means shown in FIG. 8;

DETAILED DESCRIPTION OF THE PREFERRED EMBODIMENTS

Figure 1:
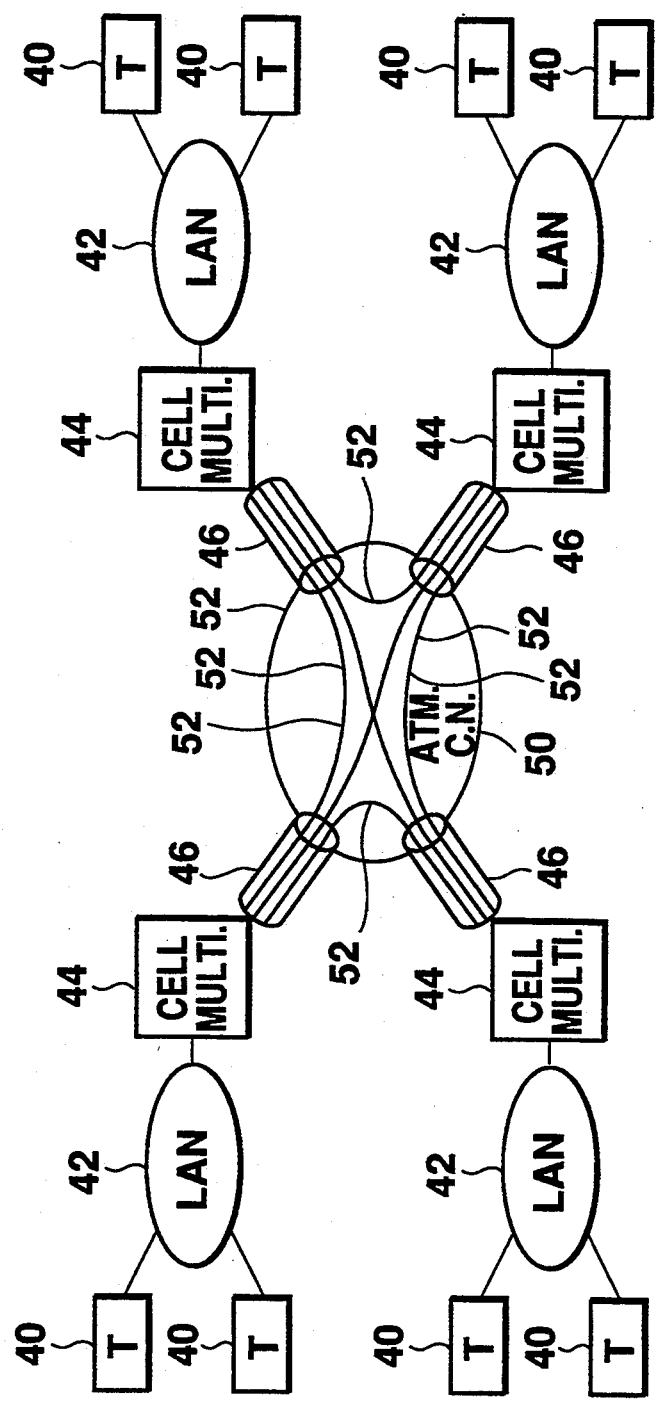
FIG. 1 is a schematic diagram of a digital transmission system in which the ATM cell exchanging apparatus of the present invention may be used.

FIG. 1 shows a digital transmission system in which the cell exchanging apparatus of the present invention may be used. The digital transmission system of FIG. 1 includes an ATM communication network 50. The system also includes terminals 40 that serve as the source and destination of cells that are passed across the network. The terminals are connected to local area networks (LAN) 42, which are, in turn, connected to cell multiplexing devices 44. The cell multiplexing devices 44 serve as interfaces between LAN's 42 and the ATM communication network 50. Cells originating from a terminal pass through a LAN 42 to a cell multiplexing device 44, wherein the cells are multiplexed across the ATM communication network 50. Each of the cell multiplexing devices 44 is connected to a number of logical channels 46. The cell multiplexer decides which channel the cells are transmitted across. In making this decision, the cell multiplexing device selects a particular channel 52 that leads to the destination terminal. The cells are demultiplexed by a cell multiplexer device 44 that is coupled to a LAN 42 leading to the destination terminal 40. The demultiplexed cells are then transmitted over the LAN 42 to the destination terminal 40.

Figure 2:
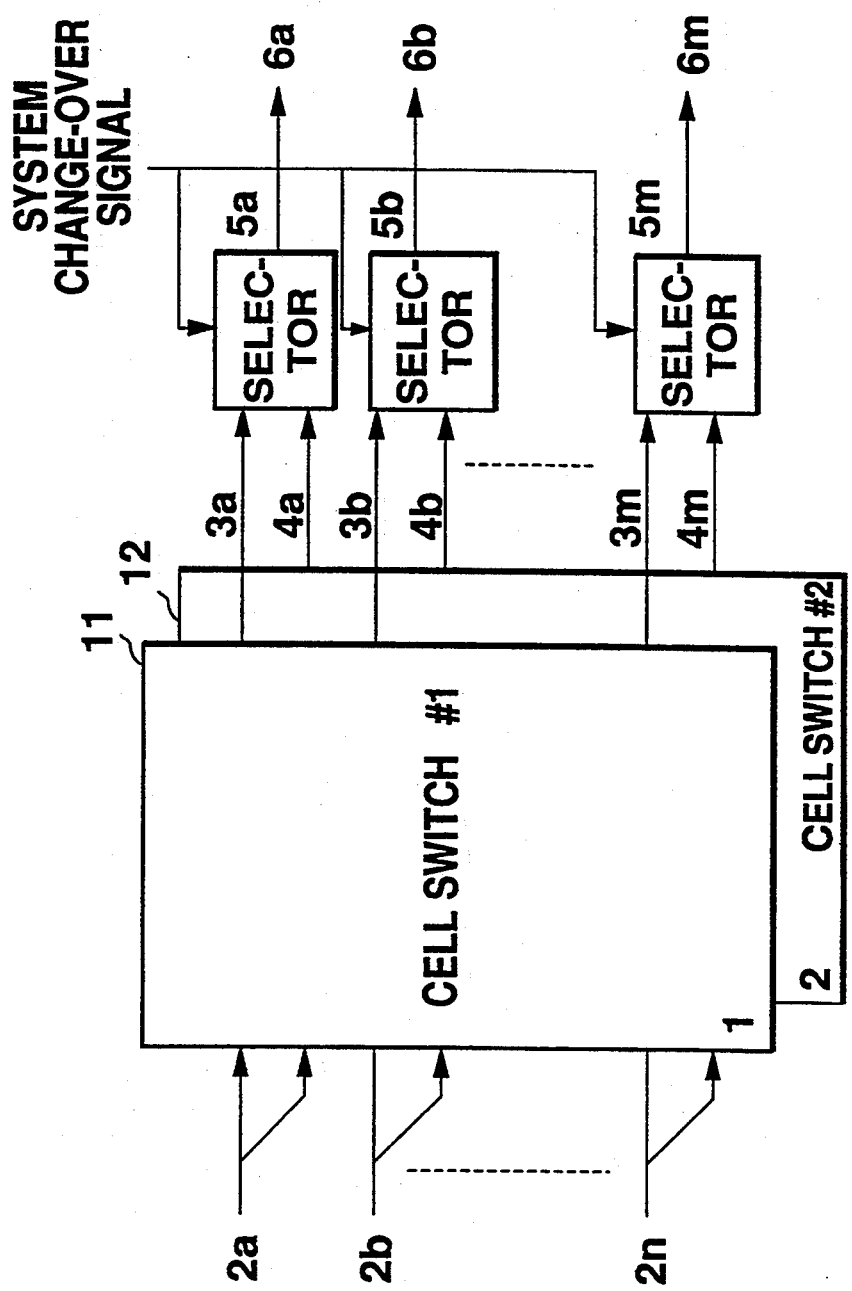
FIG. 2 is a block diagram of the structure of a first embodiment of an ATM cell exchanging apparatus, according to the present invention.

The ATM communication network 50 must include a number of switches to properly route cells across the network. The ATM network 50 is designed to operate at very high speeds (e.g. line bit-rates of 155 Mbps). As such, the switching must be done efficiently to maintain a high throughput. The present invention provides a cell exchanging apparatus that perform switching without omitting cells or repeating cells. A first preferred embodiment of a cell exchanging apparatus is shown in FIG. 2. The ATM cell exchanging apparatus of FIG. 2 is provided with a cell switch 11 for receiving cells from a plurality of input lines 2a to 2n (where n is a positive integer) and for outputting the received cells to a plurality of output lines 3a to 3m (where m is a positive integer). A suitable cell switch architecture is described in Kuwahara et al., "A Shared Buffer Memory Switch for an ATM Exchange", Proc. of IEEE, 1989. The ATM cell switching apparatus also includes an additional cell switch 12 that serves as a "spare cell" switch. This cell switch 12 has the same structure as cell switch 11 but has separate output lines 4a to 4m. Selectors 5a to 5m are coupled to the output lines 3a-3m and 4a-4m of the respective switches 11 and 12. The selectors 5a-5m select either the output lines 3a to 3m of cell switch 11 or the output lines 4a to 4m of cell switch 12. The selectors 5a to 5m output cells received from the selected lines through lines 6a to 6m. The selectors 5a-5m make their choice of lines based on the system change-over signal. This signal will be described in more detail below.

Figure 3:
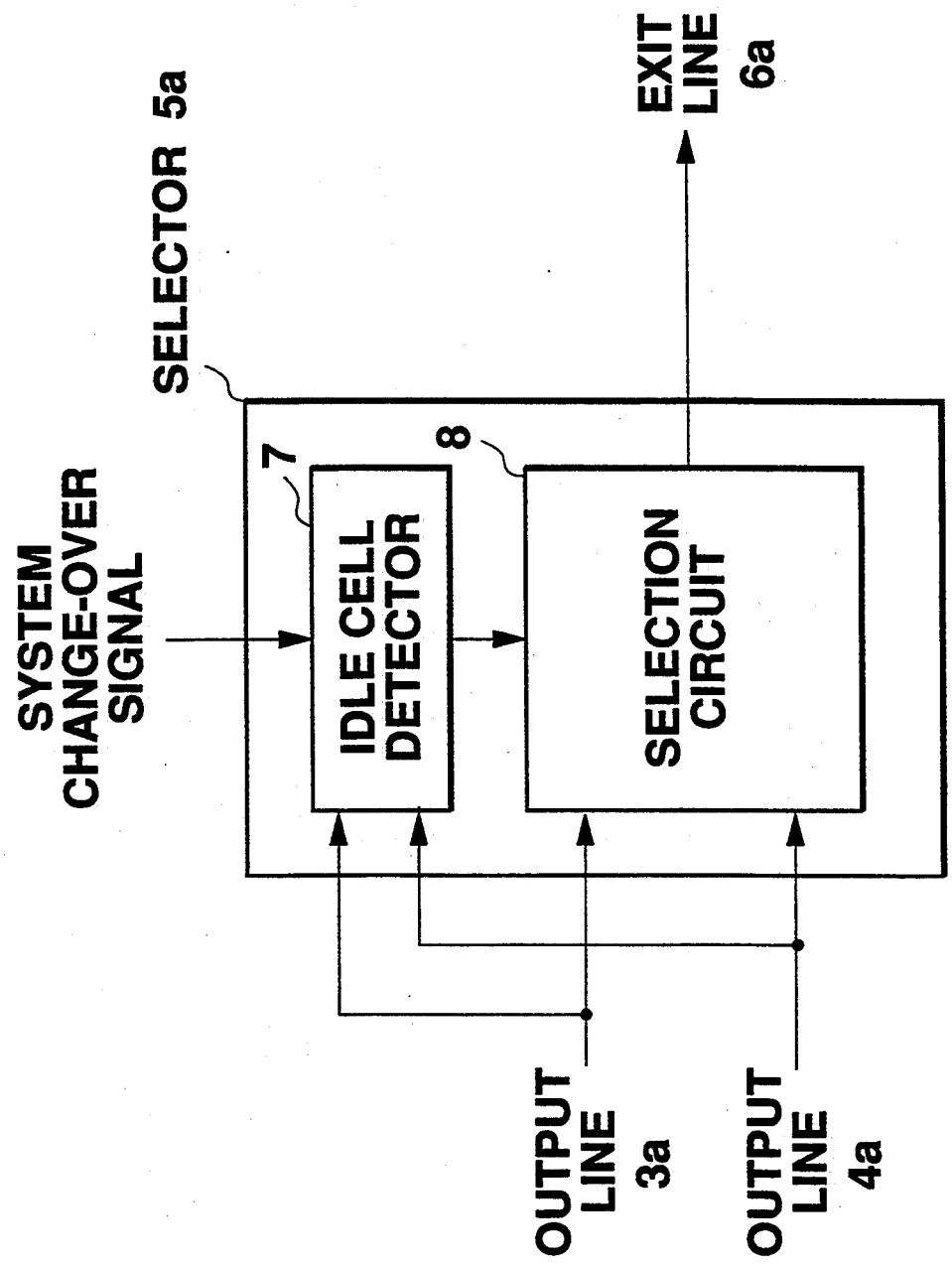
FIG. 3 is a block diagram of the selector 5a shown in FIG. 2.

FIG. 3 is a block diagram of the structure of selector 5a. Each of the other selectors 5b-5m has an identical construction. As shown in FIG. 3, the selector 5a includes an idle cell detector 7, for judging whether or not an idle or idle cell is output on the output lines 3a and 4a. When a cell switch 11 or 12 (FIG. 1) has no cell to output to one of its output lines, a idle cell is output in place of a normal cell. Cells are typically 53 bytes in length, with 48 bytes of data and 5 bytes of header information. When a cell switch 11 or 12 generates a idle cell it includes a 2 byte flag in the header information that identifies the cell as a idle cell. The idle cell detector 7 (FIG. 2) constantly monitors the output lines 3a and 4a of the two systems to determine whether any idle cells are output on lines 3a and 4a. The idle cell detector checks for the idle cell flag on incoming cells to determine whether the incoming cells are idle cells.

Figure 4:
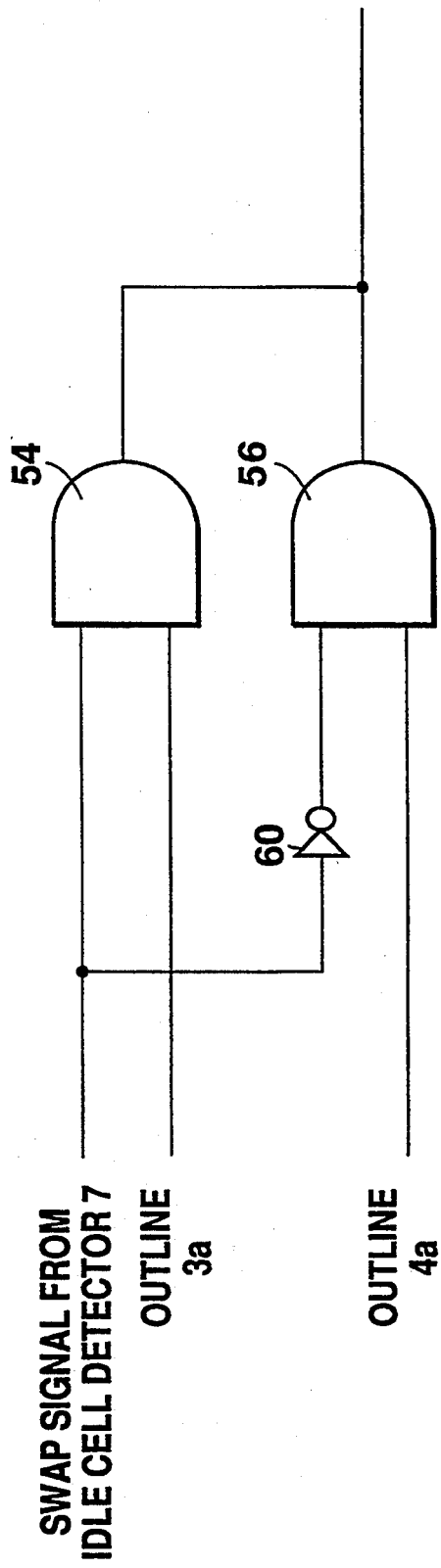
FIG. 4 is a logic diagram of the selection circuit 8 of FIG. 3.

The selector 5a further includes a selection circuit 8, for selecting either output line 3a or 4a and outputting the cell on the selected output line to the line 6a. FIG. 4 provides a more detailed view of one implementation of the selection circuit 8. The selection circuit includes two AND gates 54 and 56 and an inverter 60. If the system change-over signal is generated by an external system in response to a switch failure or other event, the idle cell detector 7 (FIG. 2) swaps the cell switch from which it selects cells by switching the selection circuit 8. Those skilled in the art will know of suitable mechanisms for generating such a system change-over signal. During normal operation, a swap signal sent from the idle cell detector 7 to the selection circuit 8 is high. As such, the cells output on line 3a (see FIG. 4) are passed through AND gate 54. In contrast, the cells output on line 4a are stopped by AND gate 56 because inverter 60 inverts the logically high output of the swap signal. However, when the system change-over signal is generated, the idle cell detector forces the swap signal to a logically low state so that the AND gate 54 stops the cells output on line 3a, whereas AND gate 56 allows the cells output on line 4a to pass.

The switching is performed only after detector 7 (FIG. 3) confirms that an idle cell is output to the output lines 3a and 4a of both systems. The systems are not switched immediately after the system change-over signal is generated but is switched only after an idle cell is output from both cell switches 11, 12 to the respective output lines. It is, thus, possible to switch the systems by a very simple circuit structure which neither duplicates nor misses any cells; hence, enhancing the throughput of the network.

The operation of this first preferred embodiment will now be explained in detail. In FIG. 2, cell switches 11 and 12 are shown for illustrative purposes as having four input lines 2a to 2d and four output lines 3a to 3d. It is assumed that each cell has a fixed length, and that cells reach the input lines 2a to 2d at substantially random times, provided that the time interval between cells is equivalent to an integral multiple of the length of a cell. In other words, it is assumed that the input phases of the cells are normalized before they reach input lines 2a to 2d and that the cells are input from all the lines in the same phase.

Figure 5:
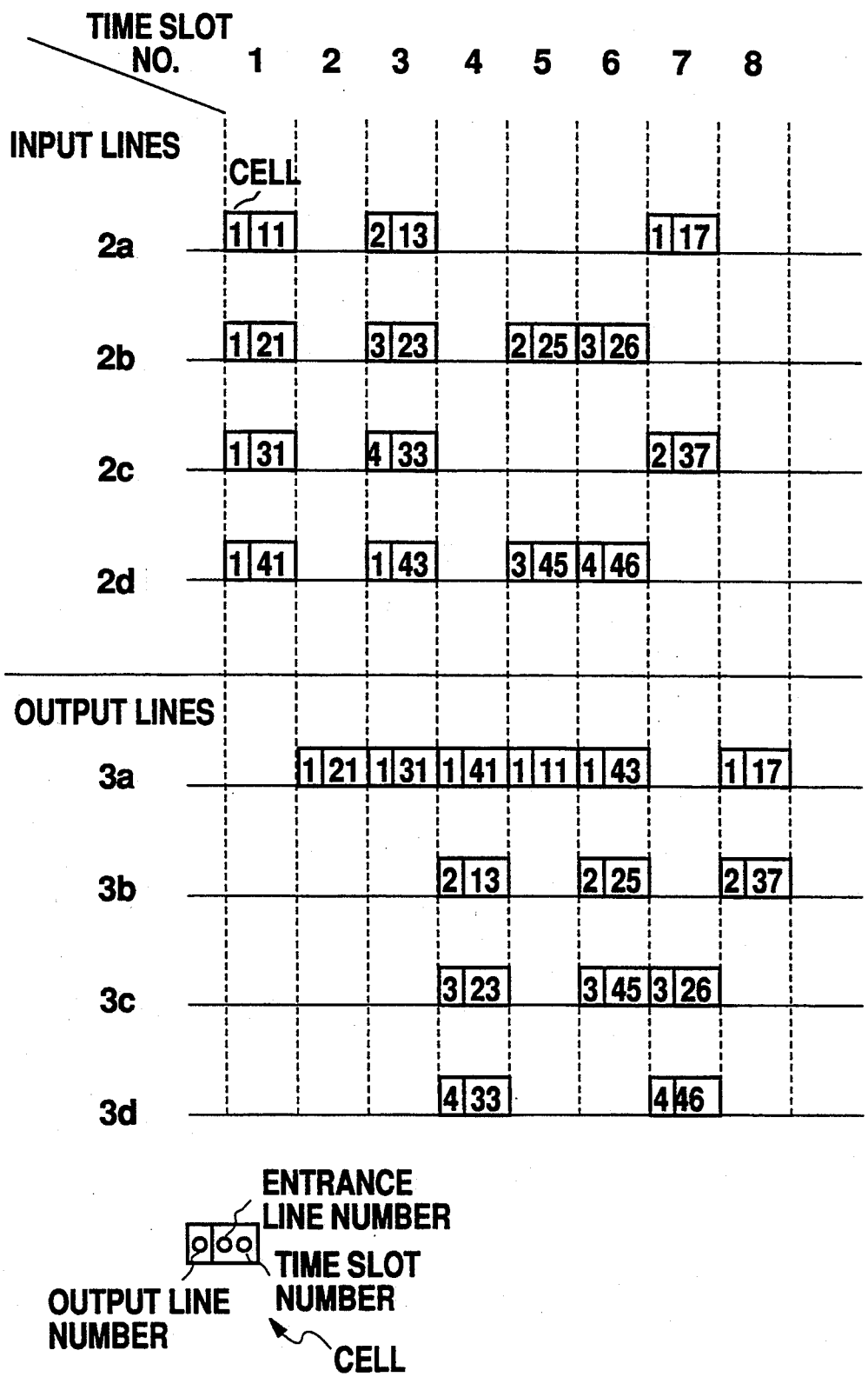
FIG. 5 is a timing diagram showing the input and output timings for the embodiment shown in FIG. 2.

The operation of the cell switch 11 will now be explained. FIG. 5 is a timing chart for signals which are input on the input lines 2a to 2d and output to the output lines 3a to 3d. The numerals provided at the top of the chart represent time slot numbers. Only one cell is input to one input line for each time slot. The numeral at the left portion of each cell represents an output line number, the numeral at the middle portion of each cell represents an input line number, and the number at the right portion of each cell represents a time slot number. The output line numbers 1 to 4 correspond to the output lines 3a to 3d, respectively, and the input line numbers 1 to 4 correspond to the input lines 2a to 2d, respectively. The time slot numbers each represent the number of the time slot in which the cell was input. The time slots showing no cells are the time slots in which no cell was received or in which a idle cell has been output.

The cells which are input to the cell switch 11 are distributed to the specified output line numbers and output during the next time slot, as a general rule. If a plurality of cells which are to be delivered to the same output line are input during the same time slot, the cells are output one after another in a predetermined order. The order may be determined in various ways. In this illustrated case, a method is employed which outputs the cells according to their input line number in a circular order of 1→2→3→4→. However, this method for ordering the output of the cells is merely illustrative and other approaches may be equally viable.

In the illustrative case of FIG. 5, during time slot 1, cells to be delivered to the first output line (output line 3a) arrive at the four input lines 2a to 2d. Therefore, the cells input from the input line numbers 2, 3, 4 and 1 are output during time slots 2 to 5, respectively, in consecutive order (namely, 2b→2c→2d→2a). During time slot 3, a cell is received on input line 2d. This cell is output at time slot 6 on output line 3a.

Since both of the cell switches 11 and 12 operate as described above, the order of outputting a plurality of cells which are to be delivered to the same address and which are input during the same time slot is sometimes different, depending upon the internal state of the cell switch. However, there is no time interval between the outputs of the cells. In other words, these plurality of cells are continuously output, and no idle cell is inserted between the cells.

In this embodiment, when a plurality of cells are to be output to the same output line, they are output in a circular order, as described above. The order of outputting the cells is not critical to the present invention. In an extreme case, the cells may be output at random.

Figure 6:
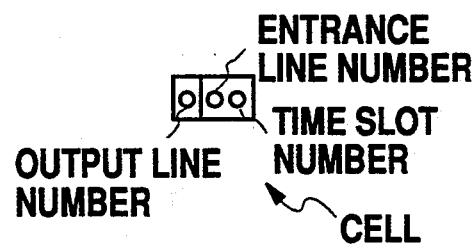
FIG. 6 is another timing diagram showing the input and output timings for the embodiment shown in FIG. 2.

The operation of the selector 5a will now be explained. The case of switching the cell switch 11, which is currently used, over to the cell switch 12 will be explained with reference to FIGS. 6 and 7. FIG. 6 is a timing chart for signals which are input from the input lines 2a to 2d and output to the output line 3a of cell switch 11 and output line 4a of cell switch 12. The input cells are exchanged by the cell switches 11, 12 so that the cells are output to output lines 3a and 4a. In FIG. 6, the cell received on input line 2a is output to the output line 3a, whereas the cell received on input line 2b is output on the output line 4a during time slot 2.

The cell switches 11 and 12 exchange cells on the basis of the same control algorithm, but since the internal states of the cell switches 11 and 12 are not always the same, the order of outputting cells in cell switch 11 is sometimes different from the order in the cell switch 12, as shown in FIG. 6 (i.e., note the order in which the cells "111", "121" and "131" are output on output lines 3a and 4a). In this case, if a changeover to system #2 occurs at time A in FIG. 6, a cell is duplicated or missed, as shown in FIG. 7A.

Figures 7A, 7B:
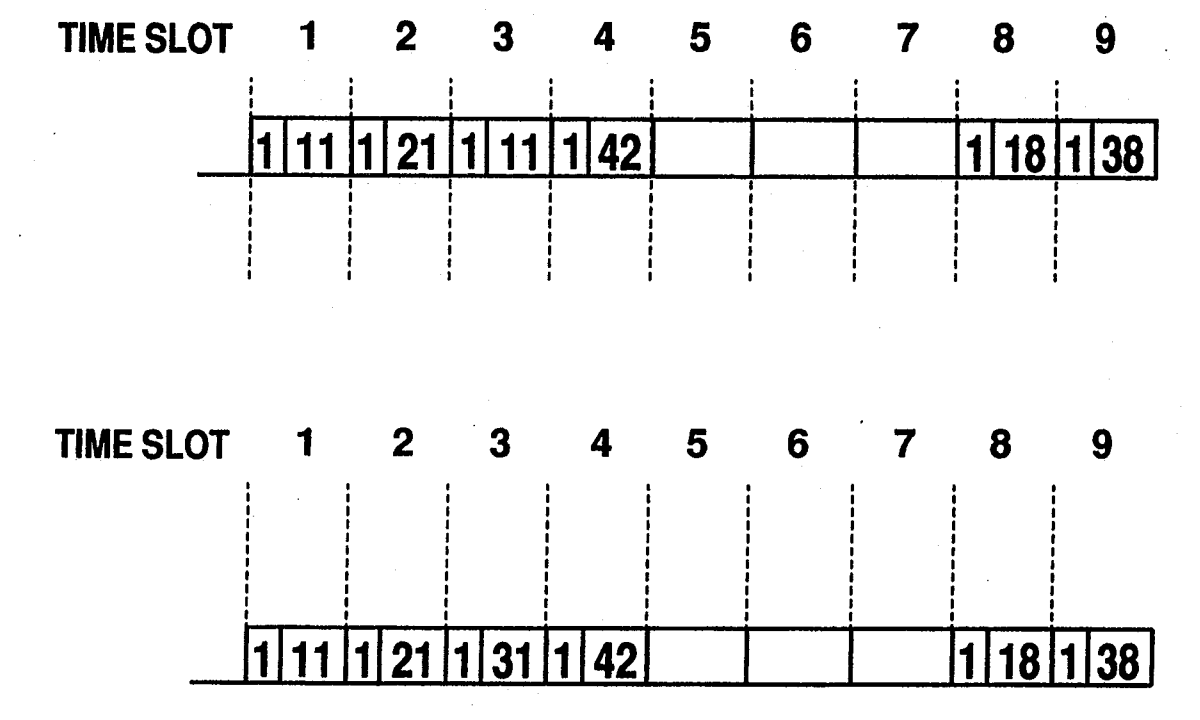

However, if the changeover to system #2 occurs at time B in FIG. 6, no cell is duplicated or missed, as shown in FIG. 7B. This is because the order of outputting cells having a idle cell therebetween is not changed, as described above.

Therefore, when the selector 5a (FIG. 3) which is connected to the output lines 3a and 4a receives a system change-over signal, the selector 5a instructs the selection circuit 8 to switch after the idle cell detector 7 detects a idle cell which is output to the output lines of both systems at time B in FIG. 6. It is, thus, possible to switch systems without duplicating or missing a cell. The selectors 5a to 5m (see FIG. 2) switch the systems in this way independently of each other. Therefore, the operation of switching the systems in the entire ATM cell exchanging apparatus as a whole is completed when all the selectors 5a to 5m have finished the switching operation.

Second Embodiment

Figure 8:
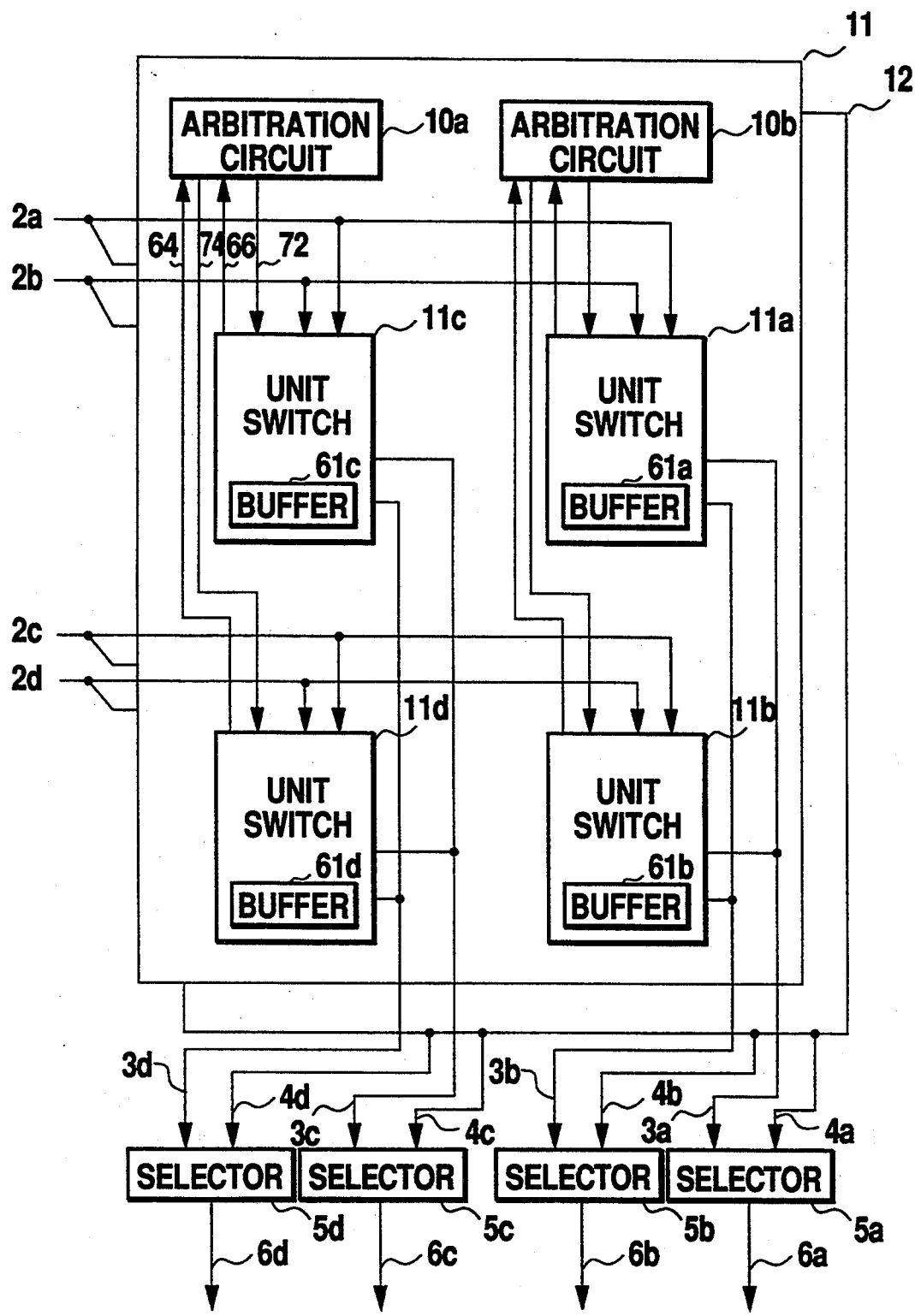
FIG. 8 is a block diagram of the structure of a second embodiment of an ATM cell exchanging apparatus according to the present invention.

Another embodiment of the present invention will now be explained with reference to FIGS. 8 to 14. FIG. 8 is a block diagram of another embodiment of an ATM cell exchanging apparatus according to the present invention. As shown in FIG. 8, each of the cell switches 11 and 12 of this embodiment is composed of four unit switches 11a–11d combined in the form of a lattice. These unit switches may be output buffer type switches, having buffers 61a–61d for storing cells. Typically, each unit switch 11a–11d is a 2×2 switch of a 4×4 switch. The cell switches 11 and 12 have arbitration circuits 10a and 10b for controlling the operation of outputting cells from unit switches 11a to 11d to the respective output lines 3a to 3d and 4a to 4d.

As in the first embodiment, each of the cell switches 11 and 12 inputs cells from the four input lines 2a to 2d, distributes the cells to the corresponding addresses and outputs the cells through the plurality of output lines 3a to 3d or 4a to 4d. Each of the selectors 5a to 5d is composed of an idle detector 7 (FIG. 3) and a selection circuit 8 like those provided in the first embodiment. The selectors 5a to 5d (FIG. 8) select either the output lines 3a to 3d of the cell switch 11 or the output lines 4a to 4d of the cell switch 12, and output cells on the selected output lines through lines 6a to 6d. When a system change-over signal is output from an external system, the selection circuit 8 (FIG. 3) is changed over to select the other switch after the idle cell detector 7 detects a idle cell which is output to the output lines of both switches.

Figure 9:
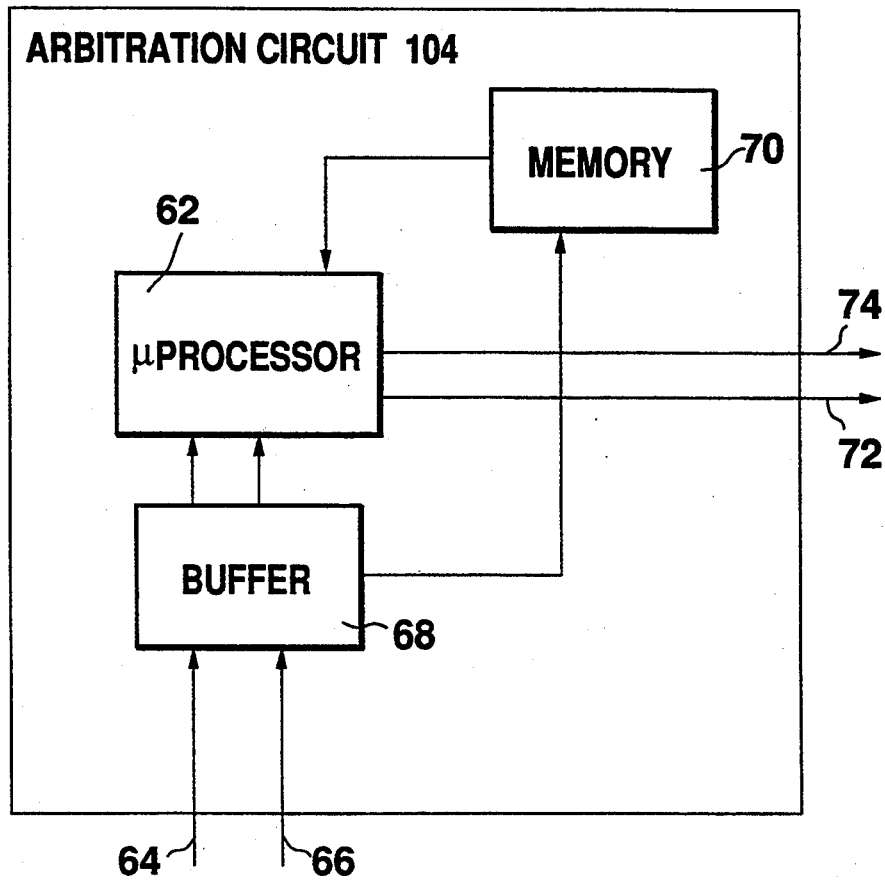
FIG. 9 is a more detailed block diagram of arbitration circuit 10a of FIG. 8.

As was mentioned above, arbitration circuits 10a and 10b are provided for controlling the operation of the outputting cells from unit switches 11a–11d to the respective output lines 3a–3d and 4a–4d. The arbitration circuits are used when there is competition in requests for a particular output line. FIG. 9 provides a more detailed like diagram of the arbitration circuit 10a. The other arbitration circuit 10b has a like configuration. The arbitration circuit 10a includes a buffer 68, a microprocessor 62 and a memory 70. This arbitration circuit 10a receives requests from unit switch 11d on line 64 and request from unit switch 11c on line 66. These requests are stored in a buffer 68 and are then forwarded to a microprocessor 62. The memory 70 holds a history of permission request to send information to a particular address. The microprocessor 62 uses the contents of memory 70 to determine whether permission should be granted for the request received on lines 64 and 66. The appropriate information is retrieved from the memory 70 by utilizing data contained in the request that are held in the buffer 68. The microprocessor then generates a permission signal that is sent over line 72 or 74 back to the respective unit switch 11c or 11d, indicating that the request is permitted. The respective unit switch 11c or 11d then makes the appropriate switching connections to direct the cells to the appropriate output line 3c, 3d, 4c or 4d.

Figure 10:
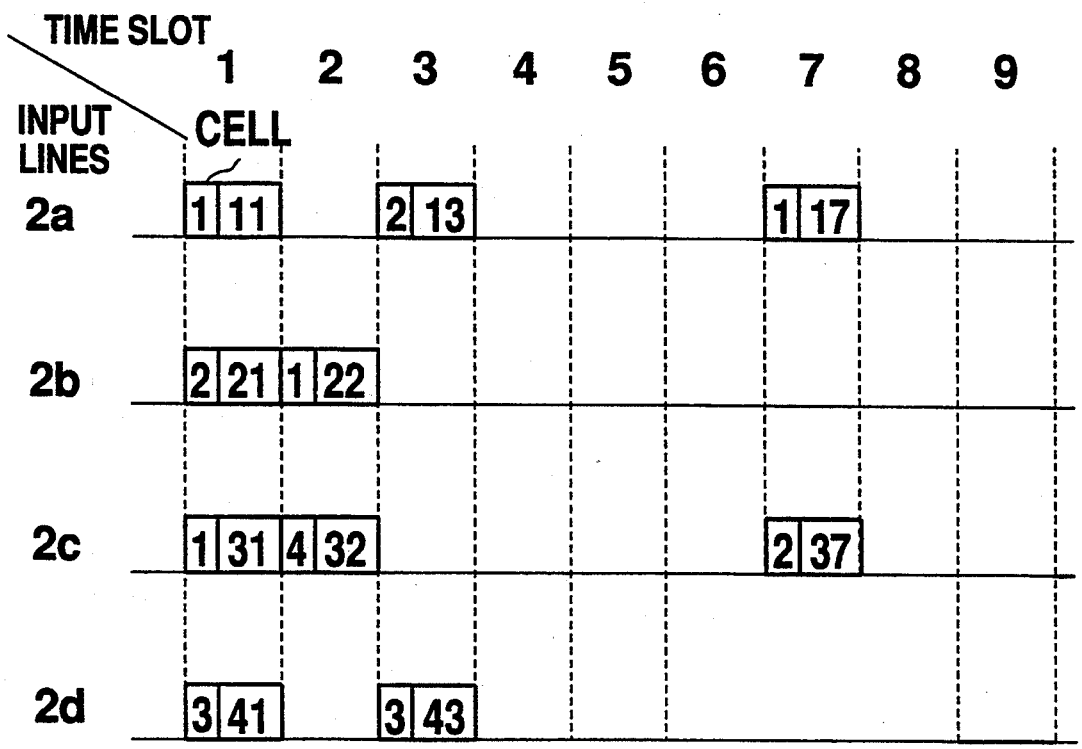
FIG. 10 is a timing chart showing the input timing for the embodiment shown in FIG. 8.
Figure 10:
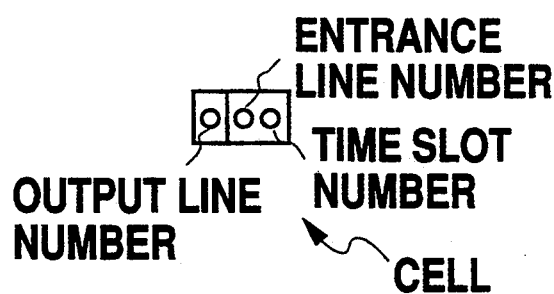

The operation of this second embodiment will now be explained in detail. The operation of the cell switch 11, and namely, the operation of each of the unit switches 11a to 11d in the cell switch 11 will first be explained. The operation of switch 12 is the same as switch 11 except where indicated otherwise. FIG. 10 is a timing chart showing the timing for inputting cells to the input lines 2a to 2d. In FIG. 10, the numerals in each cell have a similar meaning to those shown for the first embodiment. FIGS. 11A–11H are timing diagrams showing the cells stored in the buffers of the unit switches 11a to 11d.

FIG. 11A shows the cells stored in the buffer for the output line number 1 (output line 3a) of the unit switch 11a (FIG. 8), and FIG. 11B shows the cells stored in the buffer for the output line number 1 (output line 3a) of the unit switch 11b (FIG. 8). Similarly, FIG. 11C shows the cells stored in the buffer for the output line number 2 (output line 3b) of the unit switch 11a (FIG. 8), and FIG. 8D shows the cells stored in the buffer for the output line number 2 (output line 3b) of the unit switch 11b (FIG. 8). FIG. 11E shows the cells stored in the buffer for the output line number 3 (output line 3c) of the unit switch 11c (FIG. 8), and FIG. 11F shows the cells stored in the buffer for the output line number 3 (output line 3c) of the unit switch 11d (FIG. 8). FIG. 11G shows the cells stored in the buffer for the output line number 4 (output line 3d) of the unit switch 11c (FIG. 8), and FIG. 11H shows the cells stored in the buffer for the output line number 4 (output line 3d) of the unit switch 11d (FIG. 8).

Cells which are input at a certain time slot are distributed to the corresponding addresses within the unit switches 11a–11d and stored in the corresponding buffers 61a–61d at the next time slot. It will be understood for FIGS. 10 and 11A–11H that each of the cells input, for example, at the time slot 1 is stored in the corresponding buffer at the time slot 2.

Figure 12:
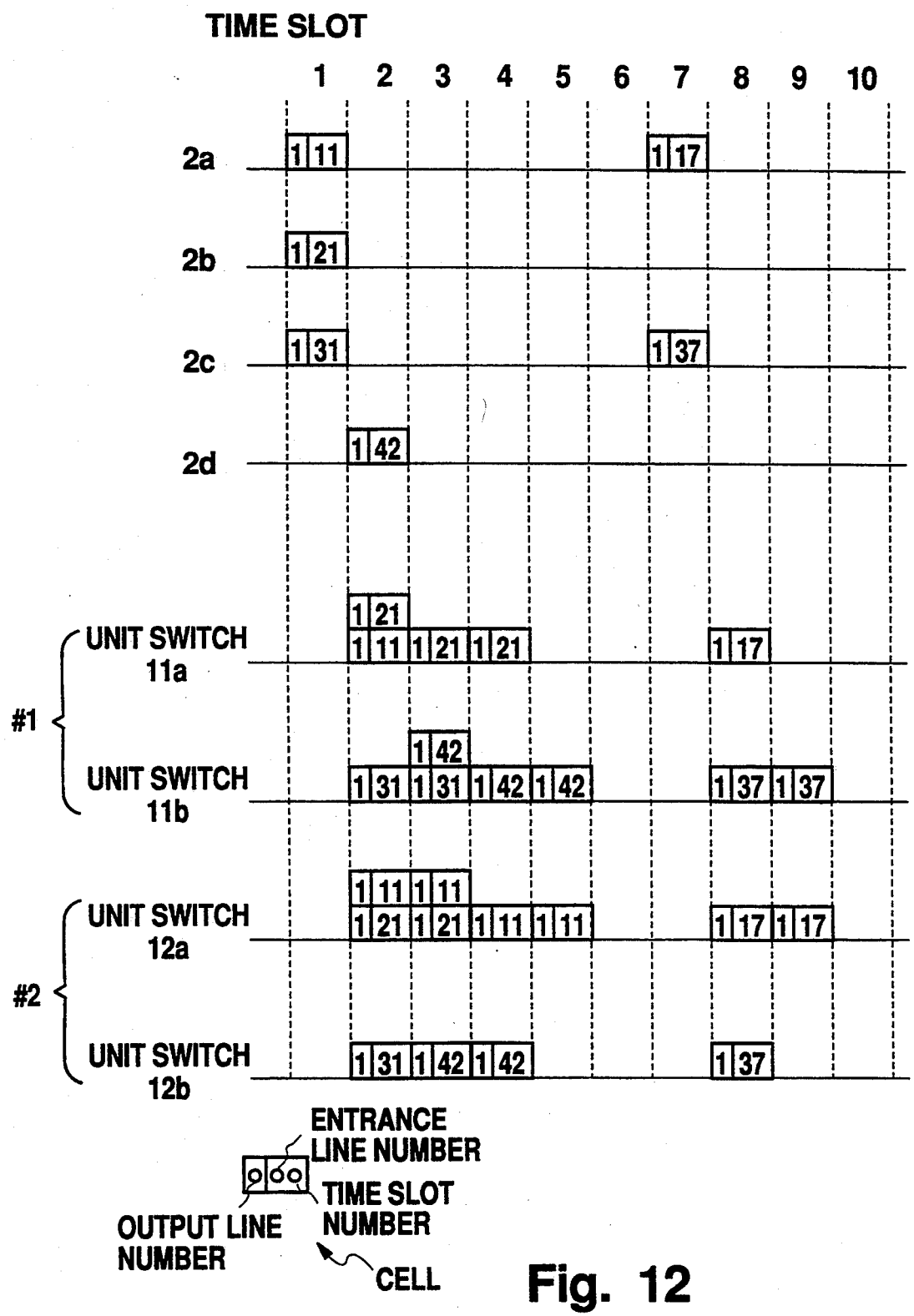
FIG. 12 is a timing diagram for the cell exchanging apparatus shown in FIG. 8.

Each of the unit switches 11a to 11d (FIG. 8) not only stores cells in its respective buffer 61a–61d but also requests permission from the corresponding arbitration circuit 10a or 10b to output a cell. If permission is granted, the unit 11a–11d switch outputs the cell at the next time slot. As shown in FIG. 12, cells having the output line number 1 are stored both in the unit switch 11a and in the unit switch 11b at time slots 2 and 3. In such a case, since it is impossible to output both cells at the same time, the cells are output one by one, in accordance with the permission of the arbitration circuit 10b (10a).

In this embodiment, if the buffers corresponding to the same output line simultaneously request permission to output a cell, the arbitration circuit 10a or 10b instructs these buffers to alternately output a cell. In FIGS. 11A–11H, a cell is output from the unit switch 11a at the time slot 3, a cell is output from the unit switch 11b at the time slot 4, and a cell is output from the unit switch 11a at the time slot 5. So long as some of the unit switches which are subject to request permission to output a cell, the arbitration circuit 10a or 10b grants permission to one of the unit switches. When no permission to output a cell to a certain output line is requested, (i.e., all the buffers corresponding to the output line are vacant), the arbitration circuit 10a (10b) instructs one of the unit switches 11c and 11d (11a and 11b) to output a idle cell.

In this embodiment, the arbitration circuit 10a or 10b grants permissions one by one to successive cells so long as there are requests for permission to output a cell. The order of outputting cells is not critical to this second embodiment. In an extreme case, there is no problem if the cells are output at random.

The operation of switching the systems by the selector 5 will now be explained. The case of switching the cell switch 11, which is currently used, over to the cell switch 12 will be explained with reference to the timing chart of FIGS. 12–14. If cells are input to the input lines 2a to 2d, as shown in FIG. 12, the cells are stored in the buffers for the output line number 1 in the unit switches 11a and 11b, as shown in FIG. 12. FIG. 12 also shows the change in the cells stored in the buffers for the output line number 1 in the unit switches 12a and 12b of the cell switch 12 of system #2.

Figure 13:
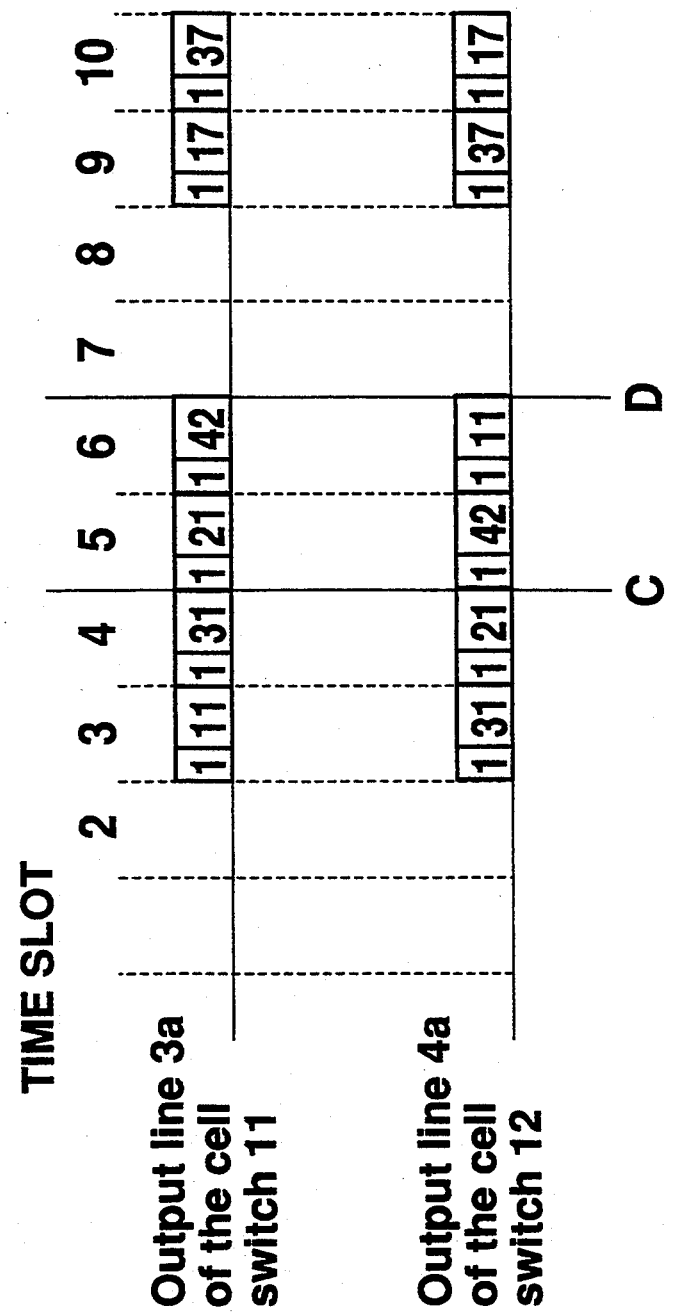
FIG. 13 is another timing diagram for the cell exchanging apparatus shown in FIG. 8.

Since the order of outputting cells is dependent upon the internal state of the respective cell switch 11 and 12, as described above, the order of outputting cells from system #1 is different from the order of outputting cells from system #2. That is, the change in cells stored in the buffers in system #1 is also different from that in system #2, as shown in FIG. 12. FIG. 13 shows the cells output to the output line 3a of the cell switch 11 when the cells stored in the buffers are changed as shown in FIG. 12. FIG. 13 also shows the cells output to the output line 4a of the cell switch 12 in the same case.

Figure 14A:
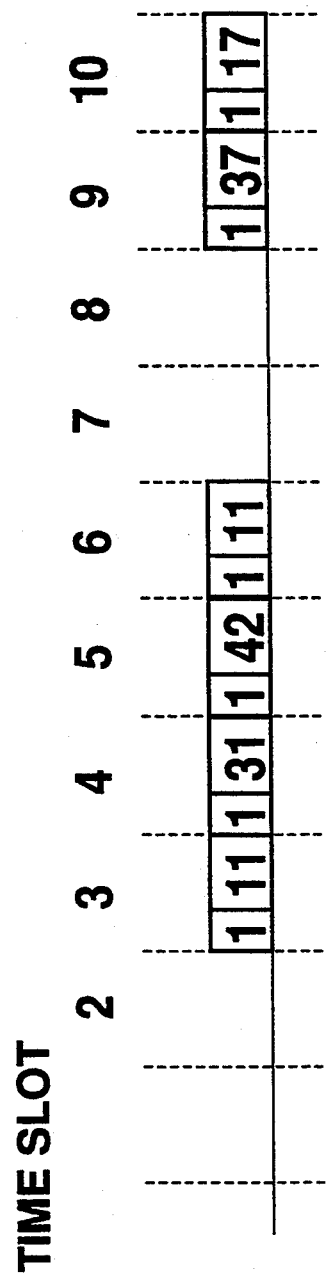
FIGS. 14A and 14B are timing diagrams for explaining the operation of a selector shown in FIG. 8.
Figure 14B:
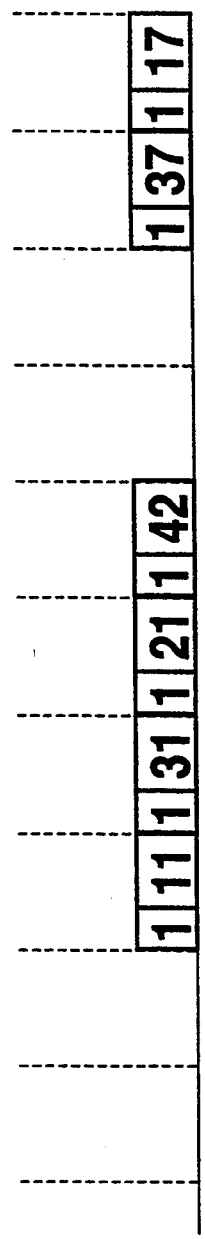
Figure 15:
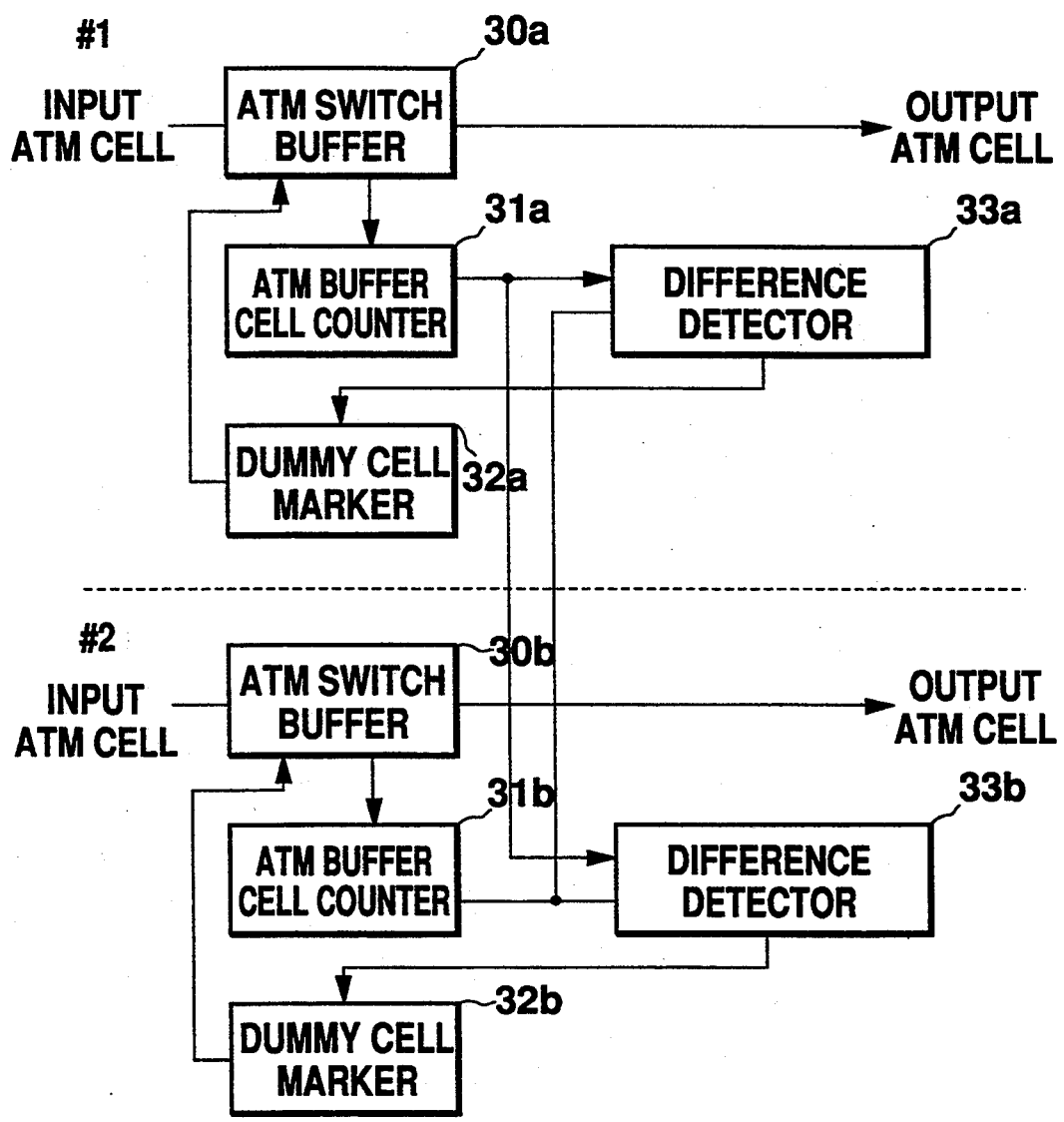
FIG. 15 is a block diagram of an example of the structure of a conventional ATM switch.
Figure 16A:
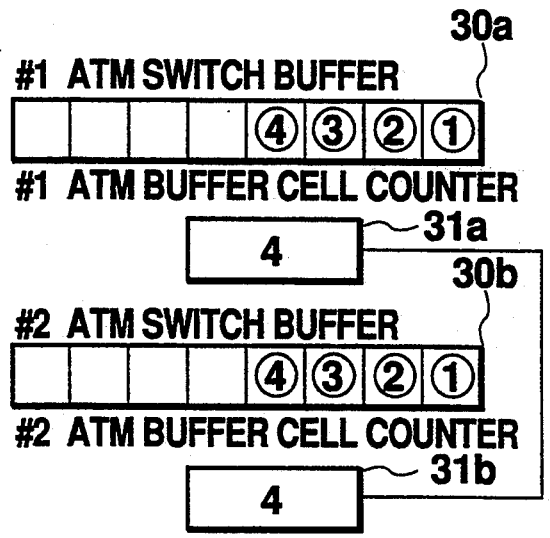
FIGS. 16A–16C are timing diagrams for explaining the operation of a conventional ATM switch.
Figure 16B:
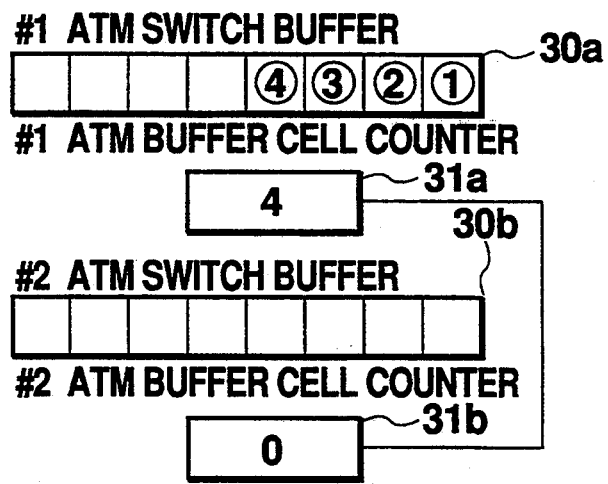
Figure 16C:
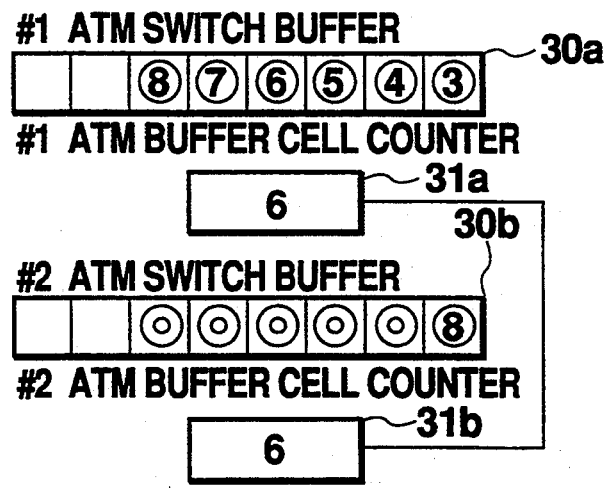
Figure 17A:
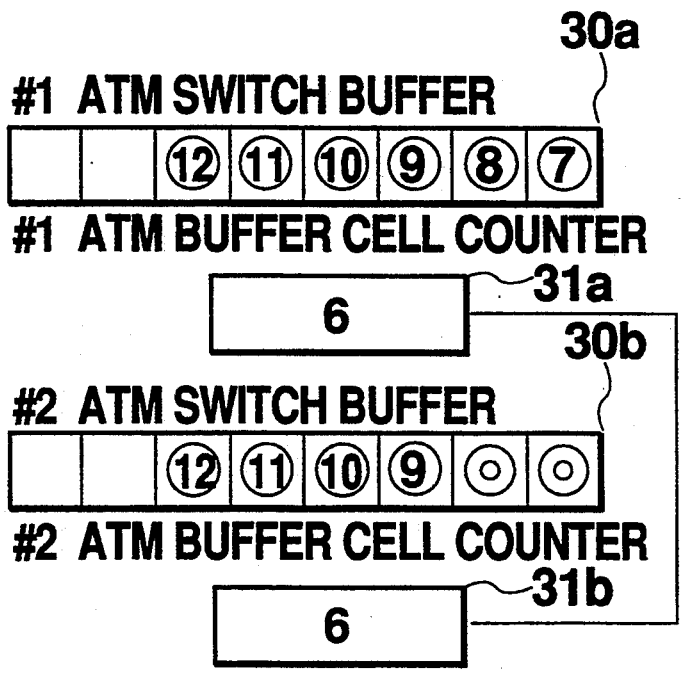
FIGS. 17A and 17B are timing diagrams for explaining the operation of a conventional ATM switch.
Figure 17B:
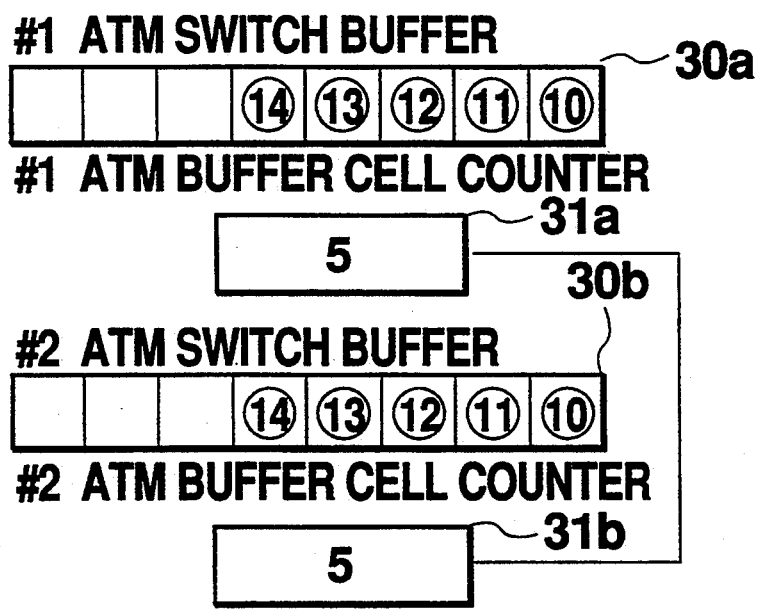

The cells output to the output line 3a of the cell switch 11 are different from the cells output to the output line 4a of the cell switch 12 in this way. FIG. 14A shows the cells finally output to the exit line 6a in the case of changing the output line 3a over to the output line 4a at the time indicated by the line C in FIG. 13. As shown in FIG. 14A, if the output lines are switched at the timing C, a cell is duplicated or missed. On the other hand, FIG. 14B shows the cells finally output to line 6a in the case of changing the output line 3a over to the output line 4a at the time indicated by the line D in FIG. 13. Unlike the example shown in FIG. 14A, no cell is duplicated or missed.

The order of outputting cells having a idle cell therebetween is not changed in this embodiment. Therefore, if the systems are switches at the timing adjacent to the timing at which an idle cell is output (such as the timing D shown in FIG. 13), switching is executed without causing duplication or omission of a cell.

Since the selectors 5a to 5d in this second embodiment perform the switching operation only when an idle cell is output to the output lines of both systems in the same way as in the first embodiment, it is possible to switch the systems without causing a duplication or missing of a cell as in the first embodiment. The selectors 5a to 5d switch the systems independently of each other in the same way as the first embodiment. Therefore, the operation of switching the systems in the ATM cell exchanging apparatus as a whole is completed when all the selectors 5a to 5d have finished switching.

As described above, according to this embodiment, since the ATM cell switch is composed of the unit switches and the arbitration circuits, it is easy to realize an ATM cell switch which outputs an idle cell when there is no cell to be output. Therefore, the switching operation of the two systems of an ATM cell exchanging apparatus is facilitated in the same way as in the first embodiment.

While there has been described what are considered to be preferred embodiments of the invention, it will be understood that various modifications may be made thereto, and it is intended that the appended claims cover all such modifications as fall within the true spirit and scope of the invention.

What is claimed is:

1. An asynchronous transfer mode (ATM) cell exchanging apparatus for distributing input cells to corresponding cell output lines, each input cell including a data portion and a header portion having address information, comprising:

a) a first cell switch for distributing the input cells to a first set of switch output lines in accordance with the address information of the header portions of the input cells, said first cell switch outputting an idle cell when there are no input cells;

b) a second redundant cell switch for distributing the input cells to a second set of switch output lines in accordance with the address information of the header portions of the input cells and independent of the first cell switch, said second redundant cell switch outputting an idle cell when there are no input cells; and c) a selection mechanism, connected to a corresponding one of the cell output lines and to a corresponding first switch output line of the first set of switch output lines and to a corresponding second switch output line of the second set of switch output lines, for selecting one of the first and second switch output lines as a currently selected switch output line that provides cells to the corresponding cell output line, and for selecting the other of the first and second switch output lines as a spare switch output line, wherein said selection mechanism is switchable between selecting the first switch output line and the second switch output line, said selection mechanism including:

a confirmation mechanism for confirming that idle cells are output on each of the currently selected switch output line and the spare switch output line before switching selection by the selection mechanism from the currently selected switch output line to the spare switch output line.

2. A cell exchanging apparatus as recited in claim 1 wherein the first cell switch comprises several unit switches.

3. A cell exchanging apparatus as recited in claim 1 wherein the second cell switch comprises several unit switches.

4. A cell exchanging apparatus as recited in claim 1, further comprising arbitration logic for arbitrating competing requests to output a cell over a same switch output line.

5. In an asynchronous transfer mode (ATM) cell exchanging apparatus, having cell output lines, a first cell switch with a first set of switch output lines, which generates idle cells when no cells are input, a second cell switch with a second set of switch output lines operating independently of the first cell switch, which generates idle cells when no cells are input, and a selection mechanism, which connects one of the first set of switch output lines and one of the second set of switch output lines to a corresponding one of the cell output lines, for selecting one of the switch output line to which the selection mechanism is connected to provide cells to the corresponding cell output line, a method, comprising the steps of:
  a) providing an initial selection that selects the first set of switch output lines to provide cells to the cell output lines;
  b) generating a change-over signal to the selection mechanism;
  c) confirming that idle cells are present on each of the switch output lines to which the selection mechanism is connected; and
  d) using the selection mechanism in response to the change-over signal so that the second switch output lines provide cells to the cell output lines.

6. The asynchronous transfer mode (ATM) cell exchanging apparatus of claim 1 wherein:
  a) said first cell switch comprises:
    i) a plurality of unit switches connected in a lattice configuration, wherein each of the unit switches outputs cells that are input from input lines to selected switch output lines in the first set of switch output lines in accordance with address information provided in the input cells, each of the unit switches being provided with an output buffer to temporarily store cells to be output, and each of the unit switches requesting permission to output a cell when a cell is stored in the output buffer of the unit switch; and
    ii) an arbitration circuit for granting permission to one of the unit switches, which are connected to same switch output lines and which are requesting permission to output a cell to said same switch output lines, so that only the cell in the unit switch which is granted permission by the arbitration circuit is output to the switch output line, and said arbitration circuit instructing one of the unit switches to output an idle cell when no unit switch requests permission to output a cell; and
  b) said second redundant cell switch comprises:
    i) a plurality of unit switches connected in a lattice configuration, wherein each of the unit switches outputs cells that are input from input lines to selected switch output lines in the second set of switch output lines in accordance with address information provided in the input cells, each of the unit switches being provided with an output buffer to temporarily store cells to be output, and each of the unit switches requesting permission to output a cell when a cell is stored in the output buffer of the unit switch; and
    ii) an arbitration circuit for granting permission to one of the unit switches which are connected to same switch output lines and, which are requesting permission to output a cell to said same switch output lines, so that only the cell in the unit switch which is granted permission by the arbitration circuit is output to the switch output line, and said arbitration circuit instructing one of the unit switches to output an idle cell when no unit switch requests permission to output a cell.

7. The asynchronous transfer mode (ATM) cell exchanging apparatus of claim 1 wherein:
  a) said first cell switch comprises:
    i) a plurality of unit switches connected in a lattice configuration, wherein each of the unit switches outputs cells that are input from input lines to selected switch output lines in the first set of switch output lines in accordance with address information provided in the input cells, each of the unit switches being provided with a buffer memory shared by the switch output lines of the unit switch to temporarily store cells to be output to the selected switch output lines connected to the unit switch, and each of the unit switches requesting permission to output a cell when a cell is stored in the shared buffer memory of the unit switch; and
    ii) an arbitration circuit for granting permission to one of the unit switches, which are connected to same switch output lines and which are requesting permission to output a cell to said same switch output lines, so that only the cell in the unit switch which is granted permission by the arbitration circuit is output to the switch output line, and said arbitration circuit instructing one of the unit switches to output an idle cell when no unit switch requests permission to output a cell; and
  b) said second redundant cell switch comprises:
    i) a plurality of unit switches connected in a lattice configuration, wherein each of the unit switches outputs cells that are input from input lines to selected switch output lines in the second set of switch output lines in accordance with address information provided in the input cells, each of the unit switches being provided with a buffer memory shared by the switch output lines of the unit switch to temporarily store cells to be output to the selected switch output lines connected to the unit switch, and each of the unit switches requesting permission to output a cell when a cell is stored in the shared buffer memory of the unit switch; and
    ii) an arbitration circuit for granting permission to one of the unit switches which are connected to same switch output lines and, which are requesting permission to output a cell to said same switch output lines, so that only the cell in the unit switch which is granted permission by the arbitration circuit is output to the switch output line, and said arbitration circuit instructing one of the unit switches to output an idle cell when no unit switch requests permission to output a cell.

8. A packet switch system for distributing an input packet to at least one of a plurality of output lines, the input packet having a data portion and a destination portion, comprising:
   a) a first switch for distributing the input packet to a first set of switch output lines in accordance with the destination portion of the input packet, said first switch outputting an idle packet when there is no input packet;
   b) a second redundant switch for distributing the input packet to a second set of switch output lines in accordance with the destination information of the input packet, said second redundant switch outputting an idle packet when there is no input packet, the first switch and the second redundant switch distributing packets in the absence of any synchronizing control therebetween; and
   c) a selection mechanism for selecting one of the first set of switch output lines and the second set of switch output lines as a currently selected set of switch output lines that provides packets to the output lines, and for selecting the other of the first set and the second set as a spare set of switch output lines, wherein said selection mechanism is switchable between selecting the first set and the second set of switch output lines, said selection mechanism including a confirmation mechanism for confirming that idle packets are output on each of the currently selected set and the spare set of switch output lines before switching selection by the selection mechanism from the currently selected set of switch output lines to the spare set of switch output lines.

9. The packet switching system of claim 8, wherein the first switch comprises:
   i) a plurality of unit switches connected in a lattice configuration, wherein each of the unit switches outputs packets that are input from input terminals to selected switch output lines in the first set of switch output lines in accordance with the destination information in the input packets, each of the unit switches being provided with an output buffer to temporarily store packets to be output, and each of the unit switches requesting permission to output a packet when a packet is stored in the output buffer of the unit switch; and
   ii) an arbitration circuit for granting permission to one of the unit switches, which are connected to a same output line and which are requesting permission to output a packet to said same output line, so that only the packet in the unit switch which is granted permission by the arbitration circuit is output to the switch output line, and said arbitration circuit instructing one of the unit switches to output an idle packet when no unit switch requests permission to output a packet.

10. The packet switching system of claim 9, wherein the arbitration circuit comprises:
   a buffer for receiving requests for permission to output a packet from said unit switches;
   a memory for storing a history of requests for permission to output a packet from said unit switches;
   a processor including means for obtaining requests from the buffer, means for obtaining the history from the memory and means for determining, according to the obtained requests and history, whether permission should be granted for the obtained request.

11. The packet switch system of claim 9, wherein the output buffer is a buffer memory shared by the output lines of the unit switch.

12. The packet switching system of claim 8, wherein the second switch comprises:
   i) a plurality of unit switches connected in a lattice configuration, wherein each of the unit switches outputs packets that are input from input terminals to selected switch output lines in the second set of switch output lines in accordance with the destination information in the input packets, each of the unit switches being provided with an output buffer to temporarily store packets to be output, and each of the unit switches requesting permission to output a packet when a packet is stored in the output buffer of the unit switch; and
   ii) an arbitration circuit for granting permission to one of the unit switches, which are connected to a same output line and which are requesting permission to output a packet to said same output line, so that only the packet in the unit switch which is granted permission by the arbitration circuit is output to the switch output line, and said arbitration circuit instructing one of the unit switches to output an idle packet when no unit switch requests permission to output a packet.

13. The packet switching system of claim 12, wherein the arbitration circuit comprises:
   a buffer for receiving requests for permission to output a packet from said unit switches;
   a memory for storing a history of requests for permission to output a packet from said unit switches;
   a processor including means for obtaining requests from the buffer, means for obtaining the history from the memory and means for determining, according to the obtained requests and history, whether permission should be granted for the obtained request.

14. The packet switch system of claim 12, wherein the output buffer is a buffer memory shared by the output lines of the unit switch.

15. In a packet switching system having a plurality of input lines for receiving packets and output lines, a first switch which distributes received packets to first switch output lines and which generates idle packets when no packets are received on the input lines, a second switch operating independent of the first switch to distribute received packets to second switch output lines and which generates idle packets when no packets are received on the input lines, a method comprising the steps of:
   a) selecting the first switch output lines to provide packets to the output lines;
   b) generating a change-over signal;
   c) verifying that idle packets are present on each of the first switch output lines and the second switch output lines; and
   d) selecting, after the step of verifying, the second switch output lines to provide packets to the output lines in response to the change-over signal.

16. The asynchronous transfer mode cell exchanging apparatus of claim 1 wherein said selection mechanism, comprises a plurality of selectors each selector being connected to a corresponding one of said cell output lines.

17. The method of claim 5, wherein the asynchronous transfer mode cell exchanging apparatus includes a plurality of said selection mechanisms, each selection mechanism being provided for a corresponding one of said cell output lines, wherein the step of generating a change-over signal includes generating the change-over signal to the plurality of selection mechanisms, and wherein the step of using the selection mechanism includes using the plurality of selection mechanisms in response to the change-over signal so that the second switch output line connected to the selection mechanism provides cells to the cell output lines.

18. A packet switch system for distributing an input packet to at least one of a plurality of output lines, the input packet having a data portion and a destination portion, comprising:
a) a first switch for distributing the input packet to a first set of switch output lines in accordance with the destination portion of the input packet, said first switch outputting an idle packet when there is no input packet;
b) a second redundant switch for distributing the input packet to a second set of switch output lines in accordance with the destination information of the input packet, said second redundant switch outputting an idle packet when there is no input packet, the first switch and the second redundant switch distributing packets in the absence of any synchronizing control therebetween; and
c) a selection mechanism for selecting one of the first set of switch output lines and the second set of switch output lines as a currently selected set of switch output lines that provides packets to the output lines, and for selecting the other of the first set and the second set as a spare set of switch output lines, wherein said selection mechanism is switchable between selecting the first set and the second set of switch output lines, said selection mechanism including a confirmation mechanism for confirming that idle packets are output on each of the currently selected set and the spare set of switch output lines before switching selection by the selection mechanism from the currently selected set of switch output lines to the spare set of switch output lines.

* * * * *